US012684630B2

(12) United States Patent
 Wang

(10) Patent No.: US 12,684,630 B2
(45) Date of Patent: Jul. 14, 2026

(54) METHOD AND APPARATUS FOR CALL DATA TRANSMISSION USING MULTIPLE CALL SERVICE CHANNELS

(71) Applicant: VIVO MOBILE COMMUNICATION CO., LTD., Dongguan (CN)

(72) Inventor: Gang Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 542 days.

(21) Appl. No.: 18/207,709

(22) Filed: Jun. 9, 2023

(65) Prior Publication Data

US 2023/0337294 A1 Oct. 19, 2023

Related U.S. Application Data

(63) Continuation of application No. PCT/CN2021/135626, filed on Dec. 6, 2021.

(30) Foreign Application Priority Data

Dec. 11, 2020 (CN) .......................... 202011453557.2

(51) Int. Cl.
 *H04W 4/00* (2018.01)
 *H04W 4/16* (2009.01)
 (Continued)

(52) U.S. Cl.
 CPC ............. *H04W 76/10* (2018.02); *H04W 4/16* (2013.01); *H04W 88/06* (2013.01)

(58) Field of Classification Search
 None
 See application file for complete search history.

(56) References Cited

U.S. PATENT DOCUMENTS 5,726,978 A * 3/1998 Frodigh ................ H04L 5/0046
 455/452.2
5,956,642 A * 9/1999 Larsson ................ H04W 16/10
 455/452.2
 (Continued)

FOREIGN PATENT DOCUMENTS

CN 102202295 A 9/2011
CN 112566165 A 3/2021
WO 2017071309 A1 5/2017

OTHER PUBLICATIONS

Extended European Search Report issued in related European Application No. 21902525.1, mailed Apr. 26, 2024, 12 pages.
 (Continued)

*Primary Examiner* — Bob A Phunkulh
(74) *Attorney, Agent, or Firm* — IPX PLLC

(57) ABSTRACT

A call method and apparatus are provided. A call method, performed by a first terminal, includes: allocating first call data to N first call service channels; and sending the first call data to a second terminal by using the N first call service channels. The first call data is transmitted to the operator by using the N first call service channels, and the first call data is re-allocated by the operator into M groups and then is sent, so that the second terminal receives, by using the M second call service channels, the first call data allocated into the M groups. N and M are positive integers, and a value of at least one of N and M is greater than 1.

15 Claims, 4 Drawing Sheets

(51) Int. Cl.
H04W 76/10 (2018.01)
H04W 88/06 (2009.01)

(56) References Cited

U.S. PATENT DOCUMENTS

| | | | | |
|---|---|---|---|---|
| 2007/0177555 | A1* | 8/2007 | Brueck | .................. H04L 12/189 |
| | | | | 455/67.14 |
| 2009/0073936 | A1 | 3/2009 | Jentz et al. | |
| 2010/0098004 | A1* | 4/2010 | Onodera | ............. H04W 72/542 |
| | | | | 370/329 |
| 2014/0254478 | A1 | 9/2014 | Deshpande et al. | |
| 2016/0374053 | A1* | 12/2016 | Hareuveni | ............ H04W 72/02 |
| 2018/0132198 | A1* | 5/2018 | Zhang | ............... H04W 72/0453 |
| 2023/0132875 | A1 | 5/2023 | Jia et al. | |

OTHER PUBLICATIONS

International Search Report issued in corresponding International Application No. PCT/CN2021/135626, mailed Feb. 24, 2022, 6 pages.
First Office Action issued in corresponding CN Patent Application No. 202011453557.2, dated Sep. 30, 2022, 6 pages.

* cited by examiner

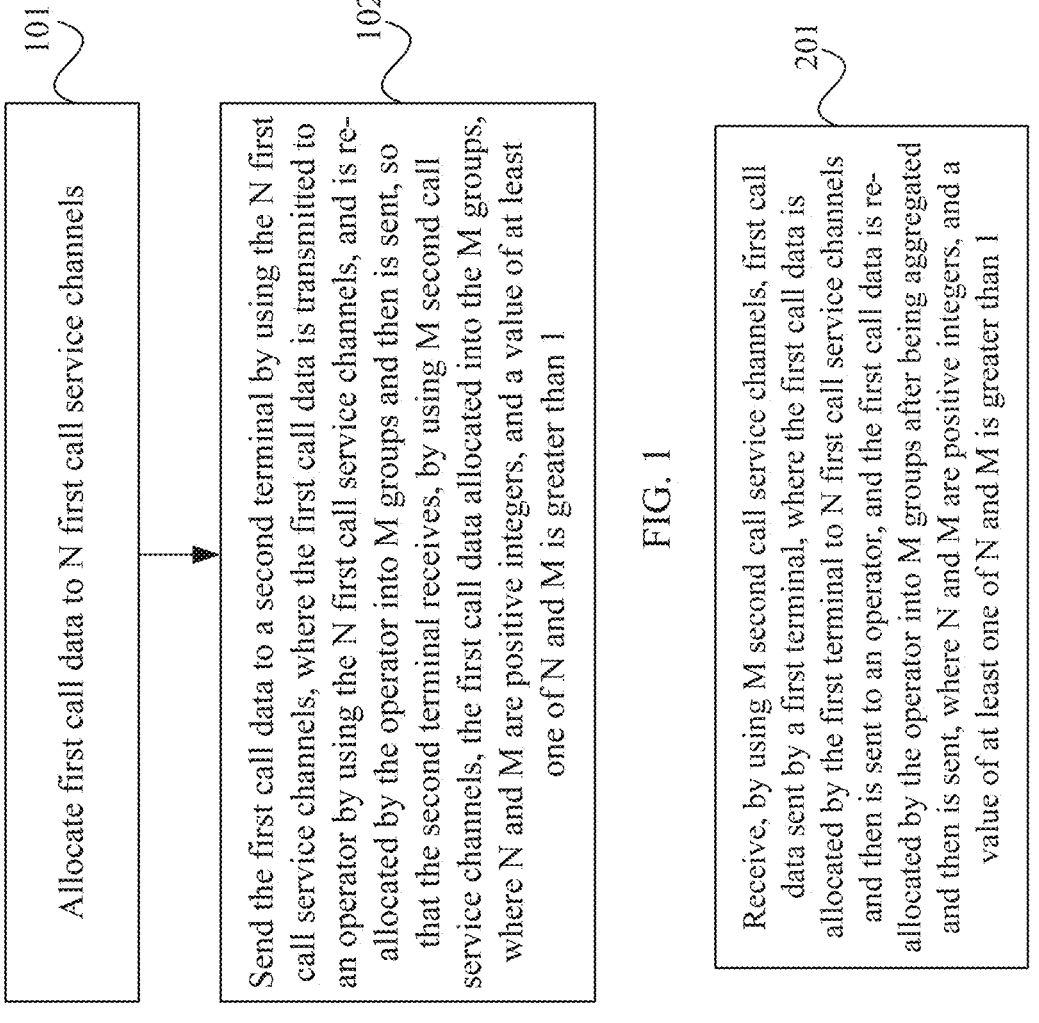

Allocate first call data to N first call service channels
101

Send the first call data to a second terminal by using the N first call service channels, where the first call data is transmitted to an operator by using the N first call service channels, and is re-allocated by the operator into M groups and then is sent, so that the second terminal receives, by using M second call service channels, the first call data allocated into the M groups, where N and M are positive integers, and a value of at least one of N and M is greater than 1
102

FIG. 1

Receive, by using M second call service channels, first call data sent by a first terminal, where the first call data is allocated by the first terminal to N first call service channels and then is sent to an operator, and the first call data is re-allocated by the operator into M groups after being aggregated and then is sent, where N and M are positive integers, and a value of at least one of N and M is greater than 1
201

FIG. 2

METHOD AND APPARATUS FOR CALL DATA TRANSMISSION USING MULTIPLE CALL SERVICE CHANNELS

CROSS-REFERENCE TO RELATED APPLICATIONS

This application is a continuation of International Application No. PCT/CN2021/135626, filed on Dec. 6, 2021, which claims priority to Chinese Patent Application No. 202011453557.2, filed on Dec. 11, 2020. The entire contents of each of the above-referenced applications are expressly incorporated herein by reference.

TECHNICAL FIELD

This application pertains to the field of communications technologies, and in particular, to a call method and apparatus.

BACKGROUND

Calls play a very important role in information exchange, including a voice call and a video multimedia call. Currently, a call technology is mainly to transmit data by using a data packet network and a circuit switched network, to establish a connection between call users and transmit call data, thereby implementing a call. In a call process, user equipment can select only one type of bearer network, for example, select the data packet network or the circuit switched network as a bearer.

In the call process, when a network channel connected to a terminal deteriorates, a handover to another network is usually selected (for example, a handover from a Wireless Fidelity (Wi-Fi) to a base station, a handover from current Wi-Fi to other Wi-Fi, or a handover from a current base station to another base station), and short interruption sometimes occurs. This causes stutter or interruption of a call, and directly affects call quality of a user. In addition, coverage ranges and strength ranges of different networks are different. For example, radio coverages signal of a base station are relatively different in different regions. In some regions with relatively poor signals, call quality of the user is difficult to be guaranteed. For example, in a dense residential building, a base station signal that can be received by the user may become small due to channel fading, which seriously affects call quality of the user.

SUMMARY

Embodiments of this application aim to provide a call method and apparatus.

According to a first aspect, an embodiment of this application provides a call method, applied to a first terminal, where N first call service channels are formed between the first terminal and an operator, M second call service channels are formed between the operator and a second terminal, and the call method includes:

allocating first call data to the N first call service channels; and sending the first call data to the second terminal by using the N first call service channels, where the first call data is transmitted to the operator by using the N first call service channels; and is re-allocated by the operator into M groups and then is sent, so that the second terminal receives, by using the M second call service channels, the first call data allocated into the M groups, where N and M are positive integers, and a value of at least one of N and M is greater than 1.

According to a second aspect, an embodiment of this application provides a call method, applied to a second terminal, where M second call service channels are formed between the second terminal and an operator, N first call service channels are formed between the operator and a first terminal, and the call method includes:

receiving, by using the M second call service channels, first call data sent by the first terminal, where the first call data is allocated by the first terminal to the N first call service channels and then is sent to the operator, and the first call data is re-allocated by the operator into M groups after being aggregated and then is sent, where N and M are positive integers, and a value of at least one of N and M is greater than 1.

According to a third aspect, an embodiment of this application provides a call apparatus, applied to a first terminal, where N first call service channels are formed between the first terminal and an operator, M second call service channels are formed between the operator and a second terminal, and the call apparatus includes:

an allocation module, configured to allocate first call data to the N first call service channels; and a first sending module, configured to send the first call data to the second terminal by using the N first call service channels, where the first call data is transmitted to the operator by using the N first call service channels, and is re-allocated by the operator into M groups and then is sent, so that the second terminal receives, by using the M second call service channels, the first call data allocated into the M groups, where N and M are positive integers, and a value of at least one of N and M is greater than 1.

According to a fourth aspect, an embodiment of this application provides a call apparatus, applied to a second terminal, where M second call service channels are formed between the second terminal and an operator, N first call service channels are formed between the operator and a first terminal, and the call apparatus includes:

a first receiving module, configured to receive, by using the second call service channels, first call data sent by the first terminal, where the first call data is allocated by the first terminal to the N first call service channels and then is sent to the operator, and the first call data is re-allocated by the operator into M groups after being aggregated and then is sent, where N and M are positive integers, and a value of at least one of N and M is greater than 1.

According to a fifth aspect, an embodiment of this application provides an electronic device, including a processor, a memory, and a program or an instruction that is stored in the memory and that can run on the processor. The program or the instruction is executed by the processor to implement the steps of the call method in at least one of the following aspects: the steps of the call method in the first aspect and the steps of the call method in the second aspect.

According to a sixth aspect, an embodiment of this application provides a readable storage medium. A program or an instruction is stored in the readable storage medium, and the program or the instruction is executed by a processor to implement the steps of the call method in at least one of the following aspects: the steps of the call method in the first aspect and the steps of the call method in the second aspect.

According to a seventh aspect, an embodiment of this application provides a chip. The chip includes a processor and a communications interface, the communications interface is coupled to the processor, and the processor is configured to run a program or an instruction to implement the steps of the call method in at least one of the following aspects: the steps of the call method in the first aspect and the steps of the call method in the second aspect.

In the embodiments of this application, first call data is allocated to N first call service channels, and the first call data is sent to an operator by using the N first call service channels, and is re-allocated by the operator into M groups and then is sent, so that a second terminal receives, by using M second call service channels, the first call data allocated into the M groups, thereby fully utilizing network resources. Call data is transmitted by using a plurality of call service channels, thereby ensuring call smoothness and improving call quality.

BRIEF DESCRIPTION OF DRAWINGS

FIG. 1 is a schematic diagram of a call method on a first terminal side according to an embodiment of this application;

FIG. 2 is a schematic diagram of a call method on a second terminal side according to an embodiment of this application;

DETAILED DESCRIPTION

Figures 3, 4:
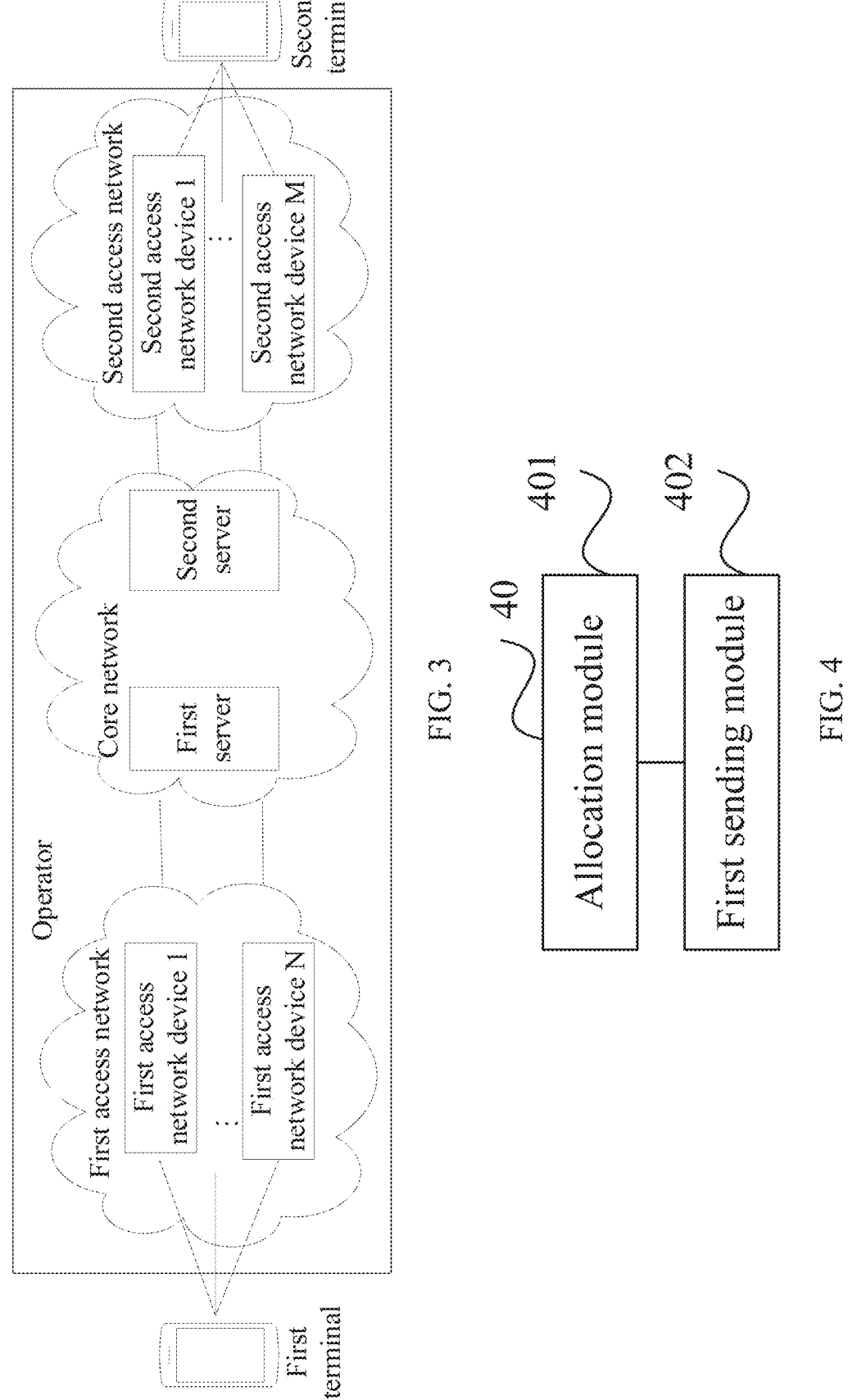
FIG. 3 is a schematic diagram of an implementation architecture corresponding to a call method according to an embodiment of this application.
FIG. 4 is a schematic diagram of a call apparatus on a first terminal side according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and the like are intended to distinguish between similar objects but do not describe a specific order or sequence. It should be understood that, the terms termed in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

With reference to the accompanying drawings, a call method provided in the embodiments of this application is described in detail by using specific embodiments and application scenarios.

FIG. 1 is a schematic flowchart of a call method according to an embodiment of this application. The method is applied to a first terminal, where N first call service channels are formed between the first terminal and an operator, M second call service channels are formed between the operator and a second terminal, and the method includes step 101 and step 102.

Step 101: Allocate first call data to the N first call service channels.

The first terminal is a call initiator, and the N first call service channels are formed between the first terminal and the operator, where N is an integer greater than or equal to 1. When a value of N is greater than 1, the first terminal may allocate the first call data to at least two first call service channels.

Step 102: Send the first call data to the second terminal by using the N first call service channels, where the first call data is transmitted to the operator by using the N first call service channels, and is re-allocated by the operator into M groups and then is sent, so that the second terminal receives, by using the M second call service channels, the first call data allocated into the M groups, where N and M are positive integers, and a value of at least one of N and M is greater than 1.

The second terminal is a call receiver, and is configured to receive the first call data sent by the first terminal. After allocating the first call data to the N first call service channels, the first terminal transmits the first call data to the operator by using the N first call service channels. After receiving the first call data, the operator re-allocates the first call data into the M groups and then sends the first call data to the second terminal, so that the second terminal can receive the first call data by using the M second call service channels between the second terminal and the operator. In a case that N is greater than 1, the first terminal may synchronously send data by using the N first call service channels.

Herein, the operator includes a first access network, a core network, and a second access network, the first access network corresponds to the first terminal, and the N first call service channels are formed between the first access network and the first terminal. In a call data transmission process, the first access network receives the first call data sent by the first terminal by using the N first call service channels, and after receiving the first call data sent by the first terminal, the first access network sends the first call data to the core network. The first call data herein belongs to service data. After receiving the first call data, the core network may re-allocate the first call data, so as to divide the first call data into the M groups, where M herein is an integer greater than or equal to 1. The second access network corresponds to the second terminal, and the M second call service channels are formed between the second access network and the second terminal. The second access network receives the first call data that is transmitted by the core network and that is divided into the M groups, and transmits the first call data to the second terminal by using the M second call service channels.

In this embodiment, the first access network includes N first access network devices, and a first call service channel is formed between the first terminal and each first access network device, to establish the N first call service channels between the first terminal and the first access network, where N is an integer greater than or equal to 1. When the value of N is greater than 1, the first terminal may be connected to at least two first access network devices.

The first terminal detects an available first access network device in a surrounding environment, and during the detection, the first terminal may enable Wi-Fi and a mobile data network switch, to implement connection to the first access network by connecting to the first access network device. For example, the first access network is accessed by establishing a connection to a base station, and the first access network is accessed by connecting to a router. The first terminal may be simultaneously connected to first access network devices of different types. For example, the first terminal is simultaneously connected to the base station and the router. In some alternative embodiments, the first terminal may be simultaneously connected to first access network devices of a same type. For example, the first terminal is simultaneously connected to two base stations or two routers. In this case, hardware of the first terminal needs to support connection.

The second access network includes M second access network devices, and a second call service channel is formed between the second terminal and each second access network device, to establish the M second call service channels between the second terminal and the second access network, where M is an integer greater than or equal to 1 The second terminal may detect an available second access network device in a surrounding environment, and during the detection, the second terminal may enable Wi-Fi and a mobile data network switch, to implement connection to the second access network by connecting to the second access network device. The second terminal may be simultaneously connected to different types of second access network devices. For example, the second terminal is simultaneously connected to the base station and the router. In some alternative embodiments, the second terminal may be simultaneously connected to second access network devices of a same type. For example, the second terminal is simultaneously connected to two base stations or two routers. In this case, hardware of the second terminal needs to support connection. The core network may obtain the value of M in advance. After completing allocation of the first call data, the core network may send the allocated data to the second access network corresponding to the second terminal.

In this embodiment, the value of at least one of N and M is greater than 1, that is, M and N cannot be 1 at the same time. When the value of M is 1, the value of N is greater than 1. In this case, the first terminal sends data by using at least two first call service channels, and the second terminal receives data by using one second call service channel. When the value of N is 1, the value of M is greater than 1. In this case, the first terminal sends data by using one two first call service channel, and the second terminal receives data by using at least two second call service channels. When both M and N are greater than 1, the values of M and N may be the same or different.

In a case that N is greater than 1, the first terminal allocates the first call data into N groups and then sends the N groups of first call data by using the N first call service channels. In this case, the N groups of first call data may be synchronously sent by using the first call service channels. Because of different channel quality, moments at which the N first access network devices receive data may be different. After receiving a corresponding part of first call data, each first access network device may send the corresponding part of first call data to the core network. When M is greater than 1, after obtaining the complete first call data, the core network allocates the first call data, and then sends the allocated data to the second access network. Moments at which the second access network devices included in the second access network receive data may be different. After receiving a corresponding part of first call data, each second access network device may send the corresponding part of first call data to the second terminal. In this process, a packet loss is not considered. In an actual transmission process, a retransmission mechanism may be used for the packet loss. The core network serves as an intermediate node, and data is allocated after the complete first call data is obtained.

It should be noted that, for a case that the first access network and the second access network are a same access network, if M is equal to N (both M and N are greater than 1), and the first access network device connected to the first terminal is the same as the second access network device connected to the second terminal, the first terminal and the second terminal may implement data transmission in a same access network by using a same device.

In this embodiment of this application, first call data is allocated to N first call service channels, and the first call data is sent to an operator by using the N first call service channels, and is re-allocated by the operator into M groups and then is sent, so that a second terminal receives, by using M second call service channels, the first call data allocated into the M groups, thereby fully utilizing network resources. Call data is transmitted by using a plurality of call service channels, thereby ensuring call smoothness and improving call quality.

In an embodiment of this application, in a case that Nis greater than 1, the allocating first call data to the N first call service channels includes:

obtaining first channel quality parameters that represent channel quality and that are respectively corresponding to the N first call service channels;

determining a first data proportion corresponding to each first call service channel according to the first channel quality parameters respectively corresponding to the N first call service channels, where the channel quality is positively correlated with the first data proportion; and allocating the first call data into N groups according to the first data proportion corresponding to each first call service channel, and allocating the allocated first call data to the N first call service channels.

In a case that N is greater than 1, the first terminal transmits the first call data by using at least two first call service channels. In some embodiments, the first call data may be synchronously transmitted by using the at least two first call service channels. Before transmitting the first call data, the first terminal needs to obtain the first channel quality parameter that represents channel quality and that corresponds to each first call service channel. The first channel quality parameter corresponding to each first call service channel may be obtained in a transmission test manner or an existing detection manner. Then, the first data proportion corresponding to each first call service channel is determined according to the first channel quality parameters respectively corresponding to the N first call service channels, and after the first data proportion corresponding to each first call service channel is determined, the first call data is allocated on the N first call service channels according to N first data proportions. After completing allocation of the first call data, the first terminal sends the allocated first call data by using the N first call service channels, and the first access network receives the allocated first call data sent by the first terminal, and transmits the allocated first call data to the core network.

The first channel quality parameter may include but is not limited to a Signal-to-Noise Ratio (SNR), a Signal-to-Interference Ratio (SIR), a Signal to Interference and Noise Ratio (SINR), a delay, a bandwidth, a packet loss rate, and the like. The first terminal may determine the first data proportion corresponding to each first call service channel according to at least one of the foregoing parameters.

Herein, the SNR, the SIR, the SINR, and the bandwidth are all positively correlated with the channel quality, the delay and the packet loss rate are all negatively correlated with the channel quality, and the channel quality is positively correlated with the first data proportion. That is, if the channel quality is better, the first data proportion is higher, so that channel resources can be fully utilized and call smoothness is ensured. After the first data proportion corresponding to each first call service channel is determined, the first call data is divided into N groups according to the N first data proportions, and is allocated on the N first call service channels.

For example, for the N first call service channels, a proportion of data transmitted on different first call service channels may be automatically adjusted by the first terminal according to a value of the SNR. The larger the SNR, the larger a first data proportion corresponding to the first call service channel.

For the packet loss rate, the value of N is 2. The first terminal obtains packet loss rates respectively corresponding to two first call service channels. If a packet loss rate corresponding to a first call service channel A is less than a packet loss rate corresponding to a first call service channel B, it may be determined that a first data proportion corresponding to the first call service channel A is greater than a first data proportion corresponding to the first call service channel B. For example, the first data proportion corresponding to the first call service channel A is 70%, and the first data proportion corresponding to the first call service channel B is 30%, so that the first call service data is divided into different proportions for transmission. A proportion of a channel with good channel quality is higher, so that channel resources can be fully utilized and a call is smoother, Herein, if first channel quality parameters are different, corresponding manners of determining first data proportions are different. A person skilled in the art may determine the first data proportions based on the different first channel quality parameters according to a principle that better channel quality corresponds to a higher first data proportion.

In this embodiment of this application, first call data is allocated according to channel quality, so that network resources can be reasonably utilize, a first data proportion corresponding to a first call service channel with better channel quality can be improved, and network switching is reduced, thereby ensuring call smoothness and improving call quality.

In an embodiment of this application, the obtaining first channel quality parameters that represent channel quality and that are respectively corresponding to the N first call service channels includes:

performing channel quality detection on the N first, call service channels according to a first preset period, and obtaining the first channel quality parameter corresponding to each first call service channel; and for each first preset period, re-determining, by the first terminal, the first data proportion corresponding to each first call service channel according to the obtained first channel quality parameters respectively corresponding to the N first call service channels.

The first terminal may periodically perform channel quality detection, that is, perform channel quality detection once in each first preset period to obtain the first channel quality parameter corresponding to each first call service channel. The first terminal re-determines a first data proportion corresponding to each first call service channel in a current first preset period according to an updated first channel quality parameter, to re-allocate the first call data according to an updated first data proportion corresponding to each first call service channel. The first preset period herein is preset, and duration of the first preset period may be adjusted. First data proportions corresponding; to a same first call service channel in different first preset periods may be different.

For example, the first terminal performs channel quality detection once at intervals of one minute. In a first minute, the first terminal obtains first channel quality parameters respectively corresponding toe two first call service channels, determines, according to the obtained first channel quality parameters, that first data proportions corresponding to the two first call service channels are respectively 40% and 60%, and in a second minute, re-obtains first channel quality parameters respectively corresponding to the two first call service channels, and determines, according to the obtained first channel quality parameters, that first data proportions corresponding to the two first call service channels are respectively 70% and 30%, to implement periodic update of the first data proportion on each first call service channel.

In this embodiment of this application, channel quality detection is performed periodically, to ensure periodic update of the first data proportion, and adjust a data amount corresponding to the first call service channel according to a change of channel quality.

In an embodiment of this application, the operator includes N first access network devices corresponding to the first terminal, and the method further includes:

sending N first connection requests corresponding to the N first access network devices to the operator; and receiving N pieces of first response information sent by the operator, and establishing an N-channel connection to the operator, so that each first access network device forms the first call service channel with the first terminal.

The first access network of the operator includes the N first access network devices. When the first terminal needs to be connected to the operator, the first terminal may send the N first connection requests corresponding to the N first access network devices to the first access network of the operator, that is, each first connection request corresponds to one first access network device, and each first connection request may carry identifier information of the corresponding first access network device. The first access network receives the N first connection requests sent by the first terminal, sends first response information for each first connection request, and establishes a connection between the first access network and the first terminal. It should be noted that, when the first terminal is connected to the first access network device, the first connection request needs to be sent at least once, to ensure implementation of the connection.

In a case that the value of N is greater than 1, the first terminal sends first connection requests to at least two first access network devices, and establishes the connection between the first access network and the first terminal in a case that the at least two first access network devices send the first response information to the first terminal. In this case, the first call service channel between each first access network device and the first terminal may be formed.

In this embodiment of this application, the first terminal sends the N first connection requests corresponding to the N first access network devices to the first access network of the operator, and receives the first response information sent by the first access network based on the first connection request, to establish the N-channel connection between the first terminal and the operator, so that the first terminal transmits call data by using the N first call service channels, thereby improving call smoothness.

In an embodiment of this application, in a case that the N first call service channels are formed between the first terminal and the operator, and the M second call service channels are formed between the second terminal and the operator, the method further includes:

sending N call setup requests to the second terminal by using the N first call service channels; and after a first call setup response fed back by the second terminal is received, completing one interaction with the second terminal, and establishing a call connection to the second terminal after at least two interactions are completed, so that the call setup request is sent by the operator to the second terminal, the operator forwards Ni call setup requests to the second terminal after receiving a first call setup request, the second terminal feeds back M call setup responses to the operator by using the M second call service channels after receiving the first call setup request, and the operator feeds back N call setup responses to the first terminal after receiving the first call setup response.

In a case that the N first call service channels are formed between the first terminal and the operator, and the M second call service channels are formed between the second terminal and the operator, a call connection between the first terminal and the second terminal can be established, thereby implementing data transmission between the first terminal and the second terminal.

When the call connection between the first terminal and the second terminal is established, the first terminal may send the N call setup requests to the second terminal by using the N first call service channels. In a case that N is greater than 1, for the N first call service channels, call setup requests corresponding to first call service channels are the same, that is, the first terminal sends the N identical call setup requests, and the N identical call setup requests may be sent synchronously.

After the first terminal sends the N call setup requests, the call setup requests first arrive at the first access network. The first access network corresponds to the N first access network devices, the first access network devices are independent of each other, and the N call setup requests are sent by using the N first call service channels. After receiving a call setup request, each first access network device may send the received call setup request to the core network. Moments at which the first access network devices receive the call setup requests may be different, and a call setup request may fail to arrive at a corresponding first access network device. Therefore, after receiving one call setup request every time, the first access network sends the call setup request to the core network.

After receiving a first call setup request, the core network may forward M call setup requests to the second access network. Content of the M call setup requests herein are the same, which may be understood as that the M call setup requests are obtained by duplicating one received call setup request, and the M call setup requests may be sent synchronously. Because the core network performs forwarding immediately after receiving one call setup request, a subsequent received call setup request may be dropped.

The second access network corresponds to the M second access network devices, and the second access network devices are independent of each other. After receiving a call setup request, each second access network device may send the received call setup request to the second terminal by using a corresponding second call service channel. Moments at which the second access network devices receive the call setup requests may be different, and a call setup request may fail to arrive at a corresponding second access network device. Therefore, after receiving one call setup request every time, the second access network sends the call setup request to the second terminal.

After receiving a first call setup request, the second terminal sends the M call setup responses to the second access network by using the M second call service channels. When Ni is greater than 1, the M call setup responses may be sent synchronously. A subsequent received call setup request may be dropped. After receiving a call setup response, each second access network device may send the received call setup response to the core network, and after receiving one a call setup response each time, the second access network sends the call setup response to the core network.

After receiving a first call setup response, the core network may forward the N call setup responses to the first access network. Content of the N call setup responses herein are the same, which may be understood as that the N call setup responses are obtained by duplicating one received call setup response, and the N call setup responses may be sent synchronously. Because the core network performs forwarding immediately after receiving one call setup response, a subsequent received call setup response may be dropped.

After receiving a call setup response, each first access network device of the first access network may send the received call setup response to the first terminal by using a corresponding first call service channel, After receiving a first call setup response, the first terminal completes one interaction between the first terminal and the second terminal, and may drop a subsequent received call setup response. The interaction herein belongs to signaling interaction. After at least two signaling interactions, the call connection between the first terminal and the second terminal may be established, that is, a multipath Transmission Control Protocol (TCP) connection between the first terminal and the second terminal may be established.

This process is illustrated by using an example. The first terminal sends two call setup requests to the second terminal by using two first call service channels. After receiving a first call setup request, the second terminal feeds back three call setup responses to the first terminal. After receiving a first call setup response, the first terminal implements one signaling interaction with the second terminal, and continues to perform the process of sending two call setup requests to the second terminal by using two first call service channels to complete a next signaling interaction. After at least two signaling interactions are repeatedly performed, the call connection between the first terminal and the second terminal may be established, that is, the multipath TCP connection between the first terminal and the second terminal may be established.

It should be noted that, for a case that the first access network and the second access network are a same access network, if M is equal to N (both M and N are greater than 1), and the first access network device connected to the first terminal is the same as the second access network device connected to the second terminal, the call setup request and the call setup response herein may be transmitted in a same access network, and still need to go through the core network.

In this embodiment of this application, a first terminal sends N call setup requests, an operator forwards M call setup requests after receiving a first call setup request, a second terminal feeds back M call setup responses after receiving the first call setup request, the operator forwards N call setup responses after receiving a first call setup response, and the first terminal completes one signaling interaction with the second terminal after receiving the first call setup response. After at least two signaling interactions, a call connection between the first terminal and the second terminal is established, and a plurality of TCP connection channels are established between the first terminal and the second terminal, thereby improving a probability of successful call setup and improving call setup reliability.

The above is the implementation procedure of the call method on the first terminal side in this embodiment of this application. First call data is allocated to N first call service channels, and the first call data is sent to an operator by using the N first call service channels, and is re-allocated by the operator into M groups and then is sent, so that a second terminal receives, by using M second call service channels, the first call data allocated into the M groups, thereby fully utilizing network resources. Call data is transmitted by using a plurality of call service channels, thereby ensuring call smoothness and improving call quality.

Call data is allocated according to channel quality, to reasonably utilize network resources, improve a call data proportion corresponding to a call service channel with better channel quality, and reduce network switching, thereby ensuring call smoothness and improving call quality. Channel quality detection is periodically performed so that a data amount corresponding to a call service channel can be adjusted according to a change of channel quality.

N call setup requests are sent, M call setup responses are fed back when a first call setup request is received, one interaction is implemented according to a received first call setup response, and a call connection is established after at least two interactions are performed, so that a plurality of TCP connection channels are established between the first terminal and the second terminal, thereby improving a probability of successful call setup and improving call setup reliability.

An embodiment of this application further provides a call method, applied to a second terminal. M second call service channels are formed between the second terminal and an operator, and N first call service channels are formed between the operator and a first terminal. As shown in FIG. 2, the method includes step 201: Receive, by using the M second call service channels, first call data sent by the first terminal, where the first call data is allocated by the first terminal to the N first call service channels and then is sent to the operator, and the first call data is re-allocated by the operator into M groups after being aggregated and then is sent, where N and M are positive integers, and a value of at least one of N and M is greater than 1.

The second terminal is a call receiver, and is configured to receive the first call data sent by the first terminal. The first terminal is a call initiator, and the N first call service channels are formed between the first terminal and the operator. When sending the first call data to the second terminal, the first terminal transmits the first call data to the operator by using the N first call service channels. After receiving the first call data, the operator re-allocates the first call data into the M groups and then sends the first call data to the second terminal, so that the second terminal can receive the first call data by using the M second call service channels between the second terminal and the operator. In a case that N is greater than 1, the first terminal may synchronously send data by using the N first call service channels.

Herein, the operator includes a first access network, a core network, and a second access network. The first access network corresponds to the first terminal, and the N first call service channels are formed between the first access network and the first terminal. The second access network corresponds to the second terminal, and the M second call service channels are formed between the second access network and the second terminal. In a call data transmission process, the first access network receives the first call data sent by the first terminal by using the N first call service channels, and sends the first call data to the core network. After receiving the first call data, the core network may re-allocate the first call data, to divide the first call data into the M groups. The second access network receives the first call data that is transmitted by the core network and that is divided into the M groups, and transmits the first call data to the second terminal by using the M second call service channels.

In this embodiment, the first access network of the operator includes N first access network devices, and a first call service channel is formed between the first terminal and each first access network device, to establish the N first call service channels between the first terminal and the first access network. The second access network of the operator includes M second access network devices, and a second call service channel is formed between the second terminal and each second access network device, to establish the M second call service channels between the second terminal and the second access network. Herein, the value of at least one of N and M is greater than 1, that is, M and N cannot be 1 at the same time. When the value of M is 1, the value of N is greater than 1. When the value of N is 1, the value of M is greater than 1. When both M and N are greater than 1, the values of M and N may be the same or different.

In this embodiment of this application, first call data that is sent by a first terminal by using N first call service channels and that is re-allocated by an operator is received by using M second call service channels, thereby fully utilizing network resources. Call data is sent by using a plurality of call service channels, thereby ensuring call smoothness and improving call quality.

In an embodiment of this application, before the receiving first call data sent by the first terminal, the method further includes:

reporting, to the operator, second channel quality parameters that represent channel quality and that are respectively corresponding to the M second call service channels, so that after the second terminal reports the second channel quality parameters, the operator determines a second data proportion corresponding to each second call service channel according to the second channel quality parameters respectively corresponding to the M second call service channels, and allocates the first call data to the M second call service channels according to the second data proportion, where the channel quality is positively correlated with the second data proportion.

Before receiving the first call data, the second terminal may report, to the operator, the second channel quality parameters respectively corresponding to the M second call service channels. Herein, the second terminal may report, to the core network by using the second access network, the second channel quality parameters respectively corresponding to the M second call service channels. When a quantity of second call service channels is greater than 1, the second terminal may send the second channel quality parameter corresponding to each second call service channel to a corresponding second access network device, and each second access network device reports the corresponding second channel quality parameter to the core network. The second terminal may further summarize the second channel quality parameters respectively corresponding to the M second call service channels, and send the summarized information to the M second access network devices by using the M second call service channels. When receiving information sent by one second access network device, the core network obtains the second channel quality parameter corresponding to each second call service channel. In this case, data allocation may be performed, and information subsequently sent by the second access network device may be dropped.

After the second terminal reports, to the core network of the operator, the second channel quality parameters respectively corresponding to the M second call service channels, the core network may determine the second data proportion corresponding to each second call service channel according to the second channel quality parameters respectively corresponding to the M second call service channels, and after determining the second data proportion corresponding to each second call service channel, divide the first call data into the M groups according to M second data proportions. After data allocation is completed, the allocated first call data is transmitted to the second access network, and the second access network transmits the received M groups of data to the second terminal by using the corresponding second call service channels.

The second channel quality parameter may include but is not limited to an SNR, an SIR, an SINR, a delay, a bandwidth, a packet loss rate, and the like. The second terminal may report at least one of the foregoing parameters. The SNR, the SIR, the SINR, and the bandwidth are all positively correlated with the channel quality, the delay and the packet loss rate are all negatively correlated with the channel quality, and the channel quality is positively correlated with the second data proportion. That is, if the channel quality is better, the second data proportion is higher, so that channel resources can be fully utilized and call smoothness is ensured.

In this embodiment of this application, the second channel quality parameter corresponding to the second call service channel is reported to the core network of the operator, and the core network allocates the first call data according to the second channel quality parameter, to reasonably utilize network resources, improve a second data proportion of a second call service channel with better channel quality, and reduce network switching, thereby ensuring call smoothness and improving call quality.

In an embodiment of this application, the reporting, to the operator, second channel quality parameters that represent channel quality and that are respectively corresponding to the M second call service channels includes:

performing channel quality detection on the M second call service channels according to a second preset period, and obtaining the second channel quality parameter corresponding to each second call service channel; and for each second preset period, reporting, to the operator, the second channel quality parameters respectively corresponding to the M second call service channels.

The second terminal may periodically perform channel quality detection, that is, perform channel quality detection once in each second preset period to obtain the second channel quality parameter corresponding to each second call service channel. The second terminal reports, to the core network of the operator, the second channel quality parameters respectively corresponding to the M second call service channels, and the core network re-determines a second data proportion corresponding to each second call service channel in a current second preset period, to re-allocate the first call data according to an updated second data proportion corresponding to each second call service channel. The second preset period herein is preset, and duration of the second preset period may be adjusted. Second data proportions corresponding to a same second call service channel in different second preset periods may be different.

In this embodiment of this application, channel quality detection is periodically performed, and the second channel quality parameter that is corresponding to each second call service channel and that is obtained through detection is reported to the core network of the operator, to ensure periodic update of the second data proportion, and adjust a data amount corresponding to the second call service channel according to a change of channel quality.

In an embodiment of this application, the operator includes M second access network devices corresponding to the second terminal, and the method further includes:

sending M second connection requests corresponding to the M second access network devices to the operator; and receiving M pieces of second response information sent by the operator, and establishing an M-channel connection to the operator, so that each second access network device forms the second call service channel with the second terminal.

The second access network of the operator includes the M second access network devices. When the second terminal needs to be connected to the operator, the second terminal may send the M second connection requests corresponding to the M second access network devices to the second access network of the operator, that is, each second connection request corresponds to one second access network device, and each second connection request may carry identifier information of the corresponding second access network device. The second access network receives the M second connection requests sent by the second terminal, sends second response information for each second connection request, and establishes a connection between the second access network and the second terminal. It should be noted that, when the second terminal is connected to the second access network device, the second connection request needs to be sent at least once, to ensure implementation of the connection.

In a case that the value of M is greater than 1, the second terminal sends second connection requests to at least two second access network devices, and establishes the connection between the second access network and the second terminal in a case that the at least two second access network devices send the second response information to the second terminal. In this case, the second call service channel between each second access network device and the second terminal may be formed.

In this embodiment of this application, the second terminal sends the M second connection requests corresponding to the M second access network devices to the second access network of the operator, and receives the second response information sent by the second access network based on the second connection request, to establish the M-channel connection between the second terminal and the operator, so that the second terminal transmits call data by using the M second call service channels, thereby improving call smoothness.

In an embodiment of this application, in a case that the M second call service channels are formed between the second terminal and the operator, and the N first call service channels are formed between the first terminal and the operator, the method further includes:

receiving a call setup request sent by the first terminal; and in response to a received first call setup request, feeding back M call setup responses to the first terminal by using the M second call service channels, where N call setup requests are sent by the first terminal by using the N first call service channels, the operator forwards M call setup requests to the second terminal after receiving the first call setup request, the operator feeds back N call setup responses to the first terminal after receiving a first call setup response, and after receiving the first call setup response, the first terminal completes one interaction with the second terminal, and establishes a call connection after at least two interactions between the second terminal and the first terminal are completed.

In a case that the M second call service channels are formed between the second terminal and the operator, and the N first call service channels are formed between the first terminal and the operator, the call connection between the first terminal and the second terminal may be established.

When the call connection between the first terminal and the second terminal is being established, the first terminal needs to send a call setup request to the second terminal as a call initiator, where the first terminal may send the N call setup requests by using the N first call service channels, and in a case that N is greater than 1, the first terminal sends N identical call setup requests. The second terminal is configured to: receive the call setup request sent by the first terminal, and when receiving the first call setup request, feed back the M call setup responses to the first terminal by using the M second call service channels, so that after receiving the first call setup response, the first terminal determines to complete one interaction with the second terminal, and implement a connection to the second terminal after at least two interactions. Interaction between the second terminal and the first terminal needs to be implemented by using the operator. The following describes in detail a process of interaction between the second terminal and the first terminal.

After the first terminal sends the N call setup requests, the call setup requests first arrive at the first access network of the operator, and the first access network corresponds to the N first access network devices. The first access network devices are independent of each other, and the N call setup requests are sent by using the N first call service channels. After receiving the call setup request, each first access network device may send the received call setup request to the core network. Moments at which the first access network devices receive the call setup requests may be different, and a call setup request may fail to arrive at a corresponding first access network device. Therefore, after receiving one call setup request every time, the first access network sends the call setup request to the core network.

After receiving a first call setup request, the core network may forward M call setup requests to the second access network. Content of the M call setup requests herein are the same, which may be understood as that the M call setup requests are obtained by duplicating one received call setup request, and the M call setup requests may be sent synchronously. Because the core network performs forwarding immediately after receiving one call setup request, a subsequent received call setup request may be dropped.

The second access network corresponds to the M second access network devices, and the second access network devices are independent of each other. After receiving a call setup request, each second access network device may send the received call setup request to the second terminal by using a corresponding second call service channel. Moments at which the second access network devices receive the call setup requests may be different, and a call setup request may fail to arrive at a corresponding second access network device. Therefore, after receiving one call setup request every time, the second access network sends the call setup request to the second terminal.

After receiving a first call setup request, the second terminal sends the M call setup responses to the second access network by using the M second call service channels. When M is greater than 1, the M call setup responses may be sent synchronously. A subsequent received call setup request may be dropped. After receiving a call setup response, each second access network device may send the received call setup response to the core network, and after receiving one a call setup response each time, the second access network sends the call setup response to the core network.

After receiving a first call setup response, the core network may forward the N call setup responses to the first access network. Content of the N call setup responses herein are the same, which may be understood as that the N call setup responses are obtained by duplicating one received call setup response, and the N call setup responses may be sent synchronously. Because the core network performs forwarding immediately after receiving one call setup response, a subsequent received call setup response may be dropped.

After receiving a call setup response, each first access network device of the first access network may send the received call setup response to the first terminal by using a corresponding first call service channel. After receiving a first call setup response, the first terminal completes one interaction between the first terminal and the second terminal, and may drop a subsequent received call setup response. The interaction herein belongs to signaling interaction. After at least two signaling interactions, the call connection between the first terminal and the second terminal may be established, that is, a multipath TCP connection between the first terminal and the second terminal may be established.

In this embodiment of this application, a first terminal sends N call setup requests, an operator forwards M call setup requests after receiving a first call setup request, a second terminal feeds back M call setup responses after receiving the first call setup request, the operator forwards N call setup responses after receiving a first call setup response, and the first terminal completes one signaling interaction with the second terminal after receiving the first call setup response. After at least two signaling interactions, a call connection between the first terminal and the second terminal is established, and a plurality of TCP connection channels are established between the first terminal and the second terminal, thereby improving a probability of successful call setup and improving call setup reliability.

The above is the implementation procedure of the call method on the second terminal side in this embodiment of this application, first call data that is sent by a first terminal by using N first call service channels and that is re-allocated by an operator is received by using M second call service channels, thereby fully utilizing network resources. Call data is sent by using a plurality of call service channels, thereby ensuring call smoothness and improving call quality.

A second channel quality parameter is reported, and the operator may allocate call data, to reasonably utilize network resources, improve a call data proportion corresponding to a call service channel with better channel quality, and reduce network switching, thereby ensuring call smoothness and improving call quality. Channel quality detection is periodically performed and the second channel quality parameter is report, so as to ensure that the operator adjusts a data amount corresponding to a call service channel according to a change of channel quality.

M call setup responses are fed back when a first call setup request is received, and a call connection is established according to at least two interactions with the first terminal, so that a plurality of TCP connection channels can be established between the first terminal and the second terminal, thereby improving a probability of successful call setup and improving call setup reliability.

The foregoing is the process in which the first terminal sends the first call data to the second terminal in this embodiment of this application. Correspondingly, the second terminal may also send second call data to the first terminal. Herein, a process in which the second terminal sends the second call data to the first terminal is similar to the process in which the first terminal sends the first call data to the second terminal, and a difference lies in that the second terminal changes from a receiver to a sender. When the second terminal sends the second call data to the first terminal, the second channel quality parameter that represents channel quality and that is corresponding to each second call service channel may be obtained. After obtaining the second channel quality parameters respectively corresponding to the M second call service channels, the second terminal may determine the second data proportion corresponding to each second call service channel, and allocate the second call data on the M second call service channels according to the M second data proportions. After completing allocation of the second call data, the second terminal may synchronously send the second call data by using the M second call service channels. Channel quality is positively correlated with a second data proportion. That is, if the channel quality is better, the second data proportion is higher, so that channel resources can be fully utilized and call smoothness is ensured.

The second terminal may periodically perform channel quality detection, that is, perform channel quality detection once in each second preset period, and re-determine, according to an updated second channel quality parameter, a second data proportion corresponding to each second call service channel in a current second preset period, to re-allocate the second call data according to an updated second data proportion corresponding to each second call service channel.

After completing allocation of the second call data, the second terminal sends the second call data to the second access network by using the M second call service channels. After receiving corresponding data, each second access network device in the second access network sends the data to the core network, and as an intermediate node, the core network divides the second call data into N groups after obtaining the complete second call data. After completing allocation of the second call data, the core network may send the allocated data to the first access network corresponding to the first terminal. After receiving the second call data sent by the core network, the first access network transmits the corresponding N groups of second call data to the first terminal by using the N first call service channels.

The core network may receive the first channel quality parameters that are reported by the terminal by using the first access network and that are respectively corresponding to the N first call service channels, and determine the first data proportion corresponding to each first call service channel according to the first channel quality parameters respectively corresponding to the N first call service channels. Herein, the first terminal may report, to the core network by using the first access network, the first channel quality parameters respectively corresponding to the N first call service channels. In this case, the first terminal sends the first channel quality parameter corresponding to each first call service channel to a corresponding first access network device, and each first access network device reports the corresponding first channel quality parameter to the core network. The first terminal may further summarize the first channel quality parameters respectively corresponding to the N first call service channels, and send the summarized information to the N first access network devices by using the N first call service channels. When receiving information sent by one first access network device, the core network obtains the first channel quality parameter corresponding to each first call service channel. In this case, data allocation may be performed, and information subsequently sent by the first access network device may be dropped. After the first data proportion corresponding to each first call service channel is determined according to the first channel quality parameter corresponding to each first call service channel, the second call data is divided into the N groups according to the N first data proportions, and is allocated to the corresponding first call service channels. After data al location is completed, the allocated second call data is transmitted to the first access network, and each first access network device transmits corresponding data to the first terminal.

The first terminal may periodically perform channel quality detection, that is, perform channel quality detection once in each first preset period, and report an updated first channel quality parameter to the core network by using the first access network. In each first preset period, the core network receives the first channel quality parameter that is corresponding to each first call service channel and that is reported by the terminal, and re-determines the first data proportion corresponding to each first call service channel according to N first channel quality parameters corresponding to a current first preset period. Then data allocation is performed. First data proportions corresponding to a same first call service channel in different first preset periods may be different.

In the foregoing process, data is sent based on the M second call service channels, and data is received based on the N first call service channels, thereby fully utilizing network resources. Call data is transmitted by using a plurality of call service channels, thereby ensuring call smoothness and improving call quality.

The core network, the first terminal, and the second terminal obtain a call data proportion based on a channel quality parameter by using a same calculation policy. Sending of the second call data is opposite to sending of the first call data, but procedures thereof are the same. For another case of sending the second call data, details are not described herein. For details, refer to the sending process of the first call data.

It should be noted that the call setup request, the call setup response, and the reported channel quality parameter in this application belong to signaling data, and the first call data and the second call data belong to service data. The first connection request between the first terminal and the first access network device and the second connection request between the second terminal and the second access network device may also belong to signaling data.

FIG. 3 is a schematic diagram of an implementation architecture corresponding to a call method according to an embodiment of this application. An operator includes a first access network, a core network, and a second access network. A first terminal may be connected to N first access network devices, and when N is greater than 1, a multipath connection to the first access network is implemented. The N first access network devices are all connected to the core network (including a base station core network and a Wi-hi core network), the core network includes a first server and a second server, the N first access network devices are connected to the first server, the first server is connected to the second server, the second server is connected to M second access network devices of the second access network, and the M second access network devices are connected to a second terminal.

First call data sent by the first terminal is aggregated in the second server, and the second server allocates the first call data, that is, the second terminal reports, to the second server, a second channel quality parameter corresponding to each second call service channel, and a call setup request sent by the first terminal is forwarded by the second server. Second call data sent by, the second terminal is aggregated in the first server, and the first server allocates the second call data, that is, the first terminal reports, to the first server, a first channel quality parameter corresponding to each first call service channel, and a call setup response sent by the second terminal is forwarded by the first server.

It should be noted that a call in this embodiment of this application is not limited to a voice call, a video call, an Augmented Reality (AR)/Virtual Reality (VR) call, and a corresponding network is not limited to Wi-Fi and a mobile data network, and may further include all existing and possible future networks (for example, a visible light communications network).

It should be noted that the call method provided in the embodiments of this application may be performed by a call apparatus, or a control module that is in the call apparatus and that is configured to perform the call method. In the embodiments of this application, an example in which the call apparatus performs the call method is used to describe the call apparatus provided in the embodiments of this application.

An embodiment of this application provides a call apparatus, applied to a first terminal, where N first call service channels are formed between the first terminal and an operator, and Ni second call service channels are formed between the operator and a second terminal. As shown in FIG. 4, a call apparatus 40 includes:

an allocation module 401, configured to allocate first call data to the N first call service channels; and a first sending module 402, configured to send the first call data to the second terminal by using the N first call service channels, where the first call data is transmitted to the operator by using the N first call service channels, and is re-allocated by the operator into M groups and then is sent, so that the second terminal receives, by using the M second call service channels, the first call data allocated into the M groups, where N and M are positive integers, and a value of at least one of N and M is greater than 1.

In some embodiments, in a case that N is greater than 1, the allocation module includes:

an obtaining submodule, configured to obtain first channel quality parameters that represent channel quality and that are respectively corresponding to the N first call service channels;

a determining submodule, configured to determine a first data proportion corresponding to each first call service channel according to the first channel quality parameters respectively corresponding to the N first call service channels, where the channel quality is positively correlated with the first data proportion; and an allocation submodule, configured to: allocate the first call data into N groups according to the first data proportion corresponding to each first call service channel, and allocate the allocated first call data to the N first call service channels.

In some embodiments, the obtaining submodule is further configured to:

perform channel quality detection on the N first call service channels according to a first preset period, and obtain the first channel quality parameter corresponding to each first call service channel; and for each first preset period, re-determine the first data proportion corresponding to each first call service channel according to the obtained first channel quality parameters respectively corresponding to the N first call service channels.

In some embodiments, the operator includes N first access network devices corresponding to the first terminal, and the apparatus further includes:

a second sending module, configured to send N first connection requests corresponding to the N first access network devices to the operator; and a first receiving and setup module, configured to: receive N pieces of first response information sent by the operator, and establish an N-channel connection to the operator, so that each first access network device forms the first call service channel with the first terminal.

In some embodiments, in a case that the N first call service channels are formed between the first terminal and the operator, and the M second call service channels are formed between the second terminal and the operator, the apparatus further includes:

a third sending module, configured to send N call setup requests to the second terminal by using the N first call service channels; and a processing module, configured to: after a first call setup response fed back by the second terminal is received, complete one interaction with the second terminal, and establish a call connection to the second terminal after at least two interactions are completed, so that the call setup request is sent by the operator to the second terminal, the operator forwards M call setup requests to the second terminal after receiving a first call setup request, the second terminal feeds back M call setup responses to the operator by using the M second call service channels after receiving the first call setup request, and the operator feeds back N call setup responses to the first terminal after receiving the first call setup response.

In this embodiment of this application, first call data is allocated to N first call service channels, and the first call data is sent to an operator by using the N first call service channels, and is re-allocated by the operator into M groups and then is sent, so that a second terminal receives, by using M second call service channels, the first call data allocated into the M groups, thereby, fully utilizing network resources, Call data is transmitted by using a plurality of call service channels, thereby ensuring call smoothness and improving call quality.

Call data is allocated according to channel quality, to reasonably utilize network resources, improve a call data proportion corresponding to a call service channel with better channel quality, and reduce network switching, thereby ensuring call smoothness and improving call quality. Channel quality detection is periodically performed so that a data amount corresponding to a call service channel can be adjusted according to a change of channel quality.

N call setup requests are sent, M call setup responses are fed back when a first call setup request is received, one interaction is implemented according to a received first call setup response, and a call connection is established after at least two interactions are performed, so that a plurality of TCP connection channels are established between the first terminal and the second terminal, thereby improving a probability of successful call setup and improving call setup reliability.

Figures 5, 6:
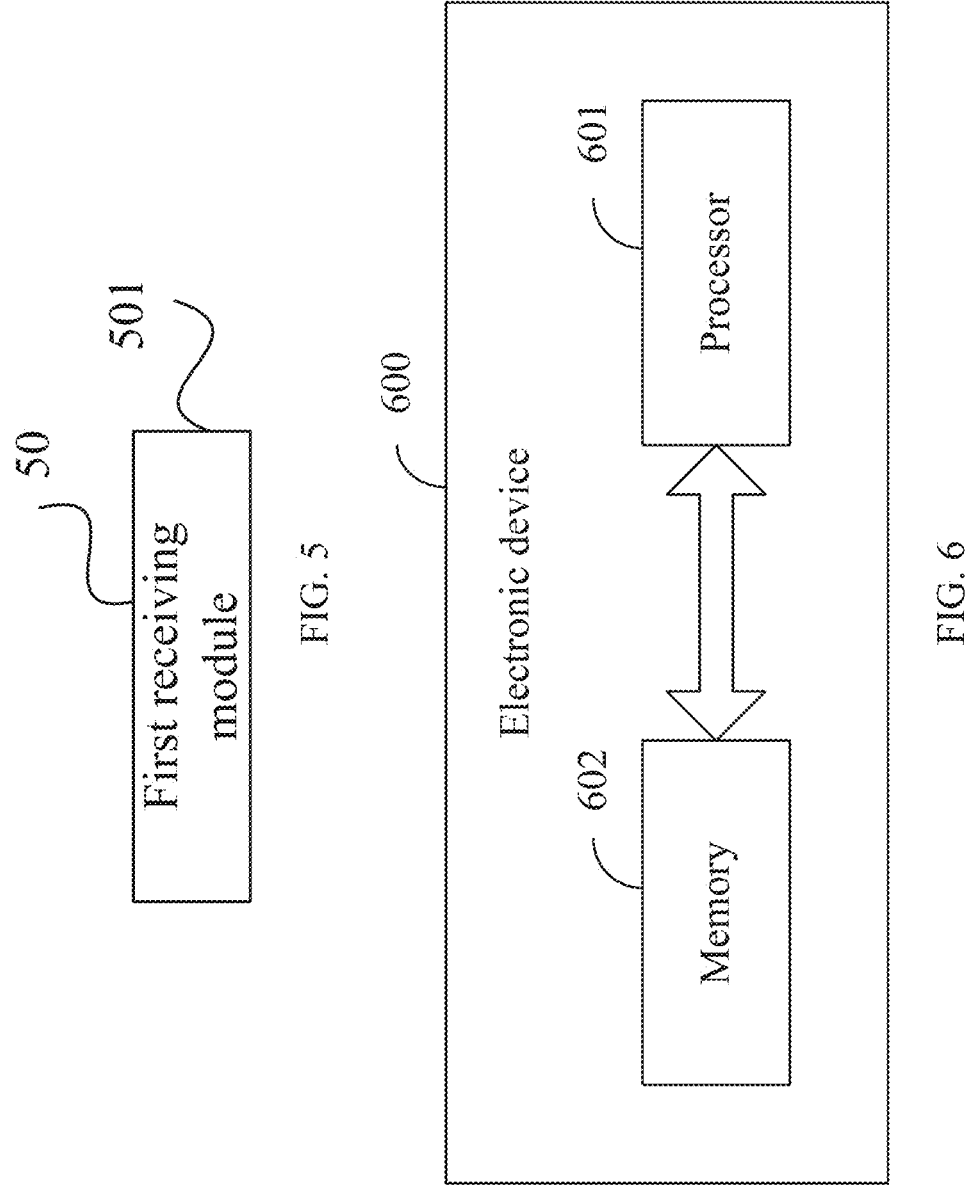
FIG. 5 is a schematic diagram of a call apparatus on a second terminal side according to an embodiment of this application.
FIG. 6 is a first schematic block diagram of an electronic device according to an embodiment of this application.

An embodiment of this application further provides a call apparatus, applied to a second terminal, where M second call service channels are formed between the second terminal and an operator, and N first call service channels are formed between the operator and a first terminal. As shown in FIG. 5, a call apparatus 50 includes:

a first receiving module 501, configured to receive, by using the M second call service channels, first call data sent by the first terminal, where the first call data is allocated by the first terminal to the N first call service channels and then is sent to the operator, and the first call data is re-allocated by the operator into M groups after being aggregated and then is sent, where N and M are positive integers, and a value of at least one of N and M is greater than 1.

In some embodiments, the apparatus further includes:

a reporting module, configured to: before the first receiving module receives the first call data sent by the first terminal, report, to the operator, second channel quality parameters that represent channel quality and that are respectively corresponding to the M second call service channels, so that after the second terminal reports the second channel quality parameters, the operator determines a second data proportion corresponding to each second call service channel according to the second channel quality parameters respectively corresponding to the M second call service channels, and allocates the first call data to the M second call service channels according to the second data proportion, where the channel quality is positively correlated with the second data proportion.

In some embodiments, the reporting module includes:

a detection and obtaining submodule, configured to: perform channel quality detection on the M second call service channels according to a second preset period, and obtain the second channel quality parameter corresponding to each second call service channel; and a reporting submodule, configured to: for each second preset period, report, to the operator, the second channel quality parameters respectively corresponding to the M second call service channels.

In some embodiments, the operator includes M second access network devices corresponding to the second terminal, and the apparatus further includes:

a fourth sending module, configured to send M second connection requests corresponding to the M second access network devices to the operator; and a second receiving and setup module, configured to: receive M pieces of second response information sent by the operator, and establish an M-channel connection to the operator, so that each second access network device forms the second call service channel with the second terminal.

In some embodiments, in a case that the M second call service channels are formed between the second terminal and the operator, and the N first call service channels are formed between the first terminal and the operator, the apparatus further includes:

a second receiving module, configured to receive a call setup request sent by the first terminal; and a feedback module, configured to: in response to a received first call setup request, teed back M call setup responses to the first terminal by using the M second call service channels, where N call setup requests are sent by the first terminal by using the N first call service channels, the operator forwards M call setup requests to the second terminal after receiving the first call setup request, the operator feeds back N call setup responses to the first terminal after receiving a first call setup response, and after receiving the first call setup response, the first terminal completes one interaction with the second terminal, and establishes a call connection after at least two interactions between the second terminal and the first terminal are completed.

In this embodiment of this application, first call data that is sent by a first terminal by using N first call service channels and that is re-allocated by an operator is received by using M second call service channels, thereby fully utilizing network resources. Call data is sent by using a plurality of call service channels, thereby ensuring call smoothness and improving call quality.

A second channel quality parameter is reported, and the operator may allocate call data, to reasonably utilize network resources, improve a call data proportion corresponding to a call service channel with better channel quality, and reduce network switching, thereby ensuring call smoothness and improving call quality. Channel quality detection is periodically performed and the second channel quality parameter is report, so as to ensure that the operator adjusts a data amount corresponding to a call service channel according to a change of channel quality.

M call setup responses are fed back when a first call setup request is received, and a call connection is established according to at least two interactions with the first terminal, so that a plurality of TCP connection channels can be established between the first terminal and the second terminal, thereby improving a probability of successful call setup and improving call setup reliability.

The call apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an Ultra-Mobile Personal Computer (UMPC), a netbook, or a Personal Digital Assistant (PDA). The non-mobile electronic device may be a server, a Network Attached Storage (NAS), a. Personal Computer (PC), a Television (TV), an automated teller machine, or a selfservice machine. This is not specifically limited in this embodiment of this application.

The call apparatus in this embodiment of this application may be an apparatus with an operating system. The operating system may be an Android operating system, an iOS operating system, or another possible operating system. This is not specifically limited in the embodiments of this application.

The call apparatus provided in this embodiment of this application can implement the processes implemented in the call method embodiment shown in FIG. 1 and FIG. 2. To avoid repetition, details are not described herein again.

For example, as shown in FIG. 6, an embodiment of this application further provides an electronic device 600. The electronic device 600 may be at least one of the following: a first terminal and a second terminal. The electronic device 600 includes a processor 601, a memory 602, and a program or an instruction that is stored in the memory 602 and that can be run on the processor 601, When the program or the instruction is executed by the processor 601, the processes of the foregoing call method embodiment are implemented and a same technical effect can be achieved. To avoid repetition, details are not described herein again.

It should be noted that the electronic device in this embodiment of this application includes the foregoing mobile electronic device and the foregoing non-mobile electronic device.

Figure 7:
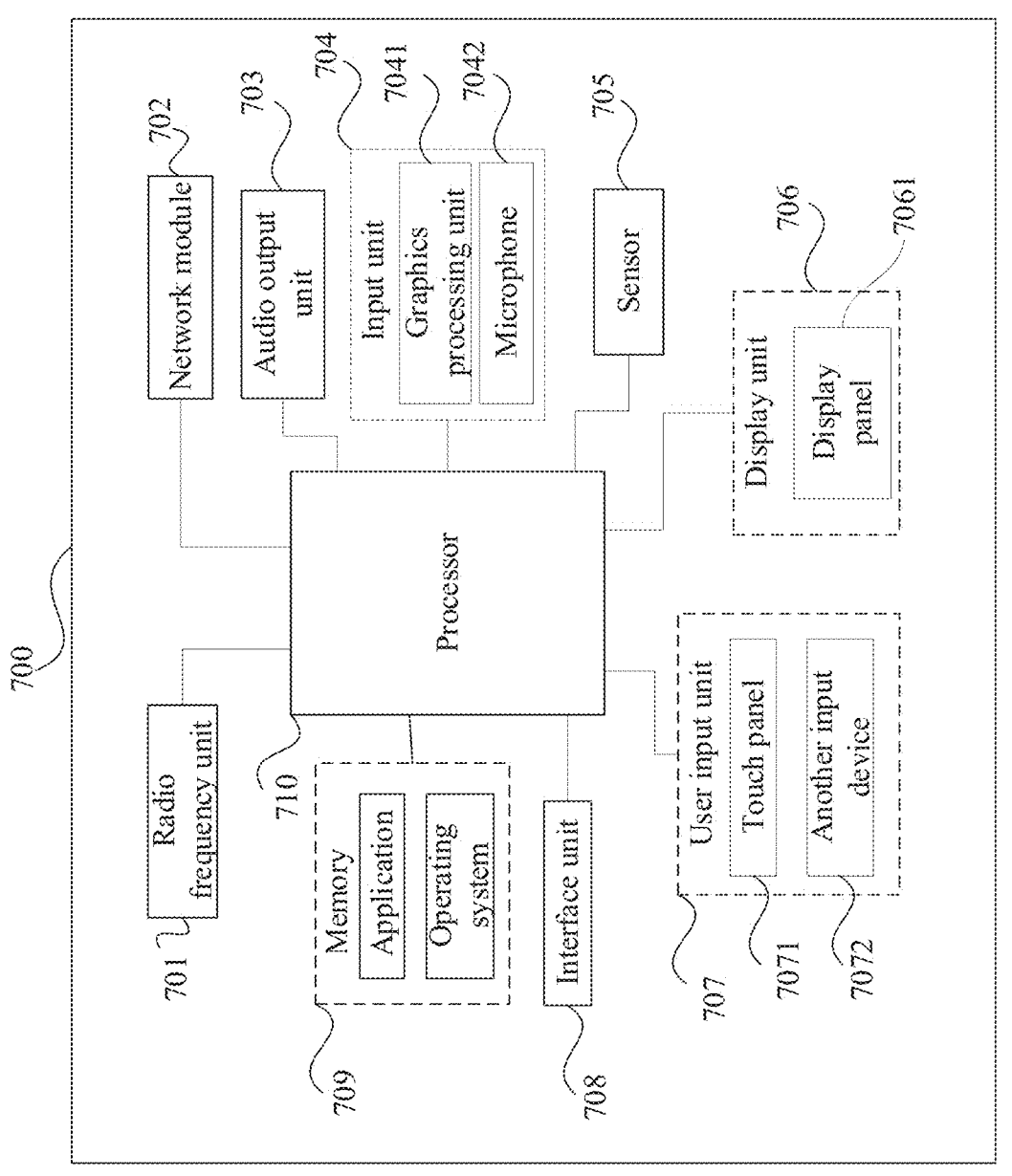
FIG. 7 is a second schematic block diagram of an electronic device according to an embodiment of this application.

FIG. 7 is a schematic structural diagram of hardware of an electronic device according to an embodiment of this application.

An electronic device 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the electronic device 700 may further include a power supply (such as a battery) that supplies power to each component. The power supply may be logically connected to the processor 710 by using a power supply management system, to implement functions such as charging and discharging management, and power consumption management by using the power supply management system. The structure of the electronic device shown in FIG. 7 does not constitute a limitation on the electronic device. The electronic device may include components more or fewer than those shown in the diagram, a combination of some components, or different component arrangements. Details are not described herein.

Herein, the electronic device may be a first terminal or a second terminal, and N first call service channels are formed between the first terminal and an operator, and M second call service channels are formed between the operator and the second terminal. When the electronic device is the first terminal, the processor 710 is configured to allocate first call data to the N first call service channels. The radio frequency unit 701 is configured to send the first call data to the second terminal by using the N first call service channels, where the first call data is transmitted to the operator by using the N first call service channels, and is re-allocated by the operator into M groups and then is sent, so that the second terminal receives, by using the M second call service channels, the first call data allocated into the M groups, where N and M are positive integers, and a value of at least one of N and M is greater than 1.

In some embodiments, when allocating the first call data to the N first call service channels, the processor 710 is further configured to: obtain first channel quality parameters that represent channel quality and that are respectively corresponding to the N first call service channels; determine a first data proportion corresponding to each first call service channel according to the first channel quality parameters respectively corresponding to the N first call service channels, where the channel quality is positively correlated with the first data proportion; and allocate the first call data into N groups according to the first data proportion corresponding to each first call service channel, and allocate the allocated first call data to the N first call service channels.

In some embodiments, when obtaining the first channel quality parameters that represent channel quality and that are respectively corresponding to the N first call service channels, the processor 710 is further configured to: perform channel quality detection on the N first call service channels according to a first preset period, and obtain the first channel quality parameter corresponding to each first call service channel; and for each first preset period, the processor 710 re-determines the first data proportion corresponding to each first call service channel according to the obtained first channel quality parameters respectively corresponding to the N first call service channels.

In some embodiments, in a case that the operator includes N first access network devices corresponding to the electronic device, the radio frequency unit 701 is further configured to: send N first connection requests corresponding to the N first access network devices to the operator; and receive N pieces of first response information sent by the operator, and establish an N-channel connection to the operator, so that each first access network device forms the first call service channel with the electronic device.

In some embodiments, the radio frequency unit 701 is further configured to: send N call setup requests to the second terminal by using the N first call service channels; and after a first call setup response fed back by the second terminal is received, complete one interaction with the second terminal, and establish a call connection to the second terminal after at least two interactions are completed, so that the call setup request is sent by the operator to the second terminal, the operator forwards M call setup requests to the second terminal after receiving a first call setup request, the second terminal feeds back M call setup responses to the operator by using the M second call service channels after receiving the first call setup request, and the operator feeds back N call setup responses to the electronic device after receiving the first call setup response.

In this way, first call data is allocated to N first call service channels, and the first call data is sent to an operator by using the N first call service channels, and is re-allocated by the operator into M groups and then is sent, so that a second terminal receives, by using M second call service channels, the first call data allocated into the M groups, thereby fully utilizing network resources. Call data is transmitted by using a plurality of call service channels, thereby ensuring call smoothness and improving call quality.

Call data is allocated according to channel quality, to reasonably utilize network resources, improve a call data proportion corresponding to a call service channel with better channel quality, and reduce network switching, thereby ensuring call smoothness and improving call quality. Channel quality detection is periodically performed so that a data amount corresponding to a call service channel can be adjusted according to a change of channel quality.

N call setup requests are sent, M call setup responses are fed back when a first call setup request is received, one interaction is implemented according to a received first call setup response, and a call connection is established after at least two interactions are performed, so that a plurality of TCP connection channels are established between the first terminal and the second terminal, thereby improving a probability of successful call setup and improving call setup reliability.

The radio frequency unit 701 is configured to: when the electronic device is the second terminal, receive, by using the M second call service channels, first call data sent by the first terminal, where the first call data is allocated by the first terminal to the N first call service channels and then is sent to the operator, and the first call data is re-allocated by the operator into M groups after being aggregated and then is sent, where N and M are positive integers, and a value of at least one of N and M is greater than 1.

In some embodiments, the radio frequency unit 701 is further configured to: before receiving the first call data sent by the first terminal, report, to the operator, second channel quality, parameters that represent channel quality and that are respectively corresponding to the M second call service channels, so that after the second channel quality parameters are reported, the operator determines a second data proportion corresponding to each second call service channel according to the second channel quality parameters respectively corresponding to the M second call service channels, and allocates the first call data to the M second call service channels according to the second data proportion, where the channel quality is positively correlated with the second data proportion.

In some embodiments, when reporting, to the operator, the second channel quality parameters that represent channel quality and that are respectively corresponding to the M second call service channels, the processor 710 is configured to: perform channel quality detection on the M second call service channels according to a second preset period, and obtain the second channel quality parameter corresponding to each second call service channel. The radio frequency unit 701 is further configured to is configured to: for each second preset period, report, to the operator, the second channel quality parameters respectively corresponding to the M second call service channels.

In some embodiments, the operator includes M second access network devices corresponding to the electronic device, and the radio frequency unit 701 is further configured to: send M second connection requests corresponding to the M second access network devices to the operator; and receive M pieces of second response information sent by the operator, and establish an M-channel connection to the operator, so that each second access network device forms the second call service channel with the electronic device.

In some embodiments, the radio frequency unit 701 is further configured to: receive a call setup request sent by the first terminal; and in response to a received first call setup request, teed back M call setup responses to the first terminal by using the M second call service channels, where N call setup requests are sent by the first terminal by using the N first call service channels, the operator forwards M call setup requests to the electronic device after receiving the first call setup request, the operator feeds back N call setup responses to the first terminal after receiving a first call setup response, and after receiving the first call setup response, the first terminal completes one interaction with the electronic device, and establishes a call connection after at least two interactions between the electronic device and the first terminal are completed.

In this way, first call data that is sent by a first terminal by using N first call service channels and that is re-allocated by an operator is received by using M second call service channels, thereby fully utilizing network resources. Call data is sent by using a plurality of call service channels, thereby ensuring call smoothness and improving call quality.

A second channel quality parameter is reported, and the operator may allocate call data, to reasonably utilize network resources, improve a call data proportion corresponding to a call service channel with better channel quality, and reduce network switching, thereby ensuring call smoothness and improving call quality. Channel quality detection is periodically performed and the second channel quality parameter is report, so as to ensure that the operator adjusts a data amount corresponding to a call service channel according to a change of channel quality.

M call setup responses are fed back when a first call setup request is received, and a call connection is established according to at least two interactions with the first terminal, so that a plurality of TCP connection channels can be established between the first terminal and the second terminal, thereby improving a probability of successful call setup and improving call setup reliability.

It should be understood that, in this embodiment of this application, the input unit 704 may include a Graphics Processing Unit (GPU) 7041 and a microphone 7042, and the graphics processing unit 7041 processes image data of a still picture or a video obtained by an image capture apparatus (such as a camera) in a video capture mode or an image capture mode. The display unit 706 may include a display panel 7061. In some embodiments, the display panel 7061 may be configured in a form such as a liquid crystal display or an organic light-emitting diode. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include but is not limited to a physical keyboard, a functional button (such as a volume control button or a power on/off button), a trackball, a mouse, and a joystick. Details are not described herein. The memory 709 may be configured to store a software program and various data, including but not limited to an application and an operating system. An application processor and a modem processor may be integrated into the processor 710, the application processor mainly processes an operating system, a user interface, an application, and the like, and the modem processor mainly processes wireless communication. It can be understood that, in some alternative embodiments, the modem processor may not be integrated into the processor 710.

An embodiment of this application further provides a readable storage medium. The readable storage medium stores a program or an instruction, and the program or the instruction is executed by a processor to implement the processes of the foregoing call method embodiment and a same technical effect can be achieved. To avoid repetition, details are not described herein again.

The processor is the processor in the electronic device in the foregoing embodiment. The readable storage medium includes a computer-readable storage medium, such as a computer Read-Only Memory (ROM), a Random Access Memory (RAM), a magnetic disk, or an optical disc.

An embodiment of this application further provides a chip. The chip includes a processor and a communications interface, the communications interface is coupled to the processor, and the processor is configured to run a program or an instruction to implement the processes of the foregoing call method embodiment, and a same technical effect can be achieved. To avoid repetition, details are not described herein again. An example of the computer-readable storage medium includes a non-transitory computer-readable storage medium, such as an ROM, an RAM, a magnetic disk, or an optical disc.

The foregoing describes the aspects of this application with reference to flowcharts and/or block diagrams of the method, the apparatus (system), and the computer program product according to the embodiments of this application. It should be understood that each block in the flowchart and/or block diagram and a combination of blocks in the flowchart and/or block diagram may be implemented by a computer program instruction. These computer program instructions may be provided for a general-purpose computer, a dedicated computer, or a processor of another programmable data processing apparatus to generate a machine, so that when these instructions are executed by the computer or the processor of the another programmable data processing apparatus, specific functions/actions in one or more blocks in the flowcharts and/or in the block diagrams are implemented. The processor may be but is not limited to a general purpose processor, a dedicated processor, a special application processor, or a field programmable logic circuit. It should be further understood that each block in the block diagram or the flowchart and a combination of blocks in the block diagram or the flowchart may be implemented by using dedicated hardware that performs a specified function or operation, or may be implemented by using a combination of dedicated hardware and a computer instruction.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In some embodiments, this application essentially or the part contributing to the prior art may be implemented in a form of a computer software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A call method, performed by a first terminal, wherein N first call service channels are formed between the first terminal and an operator, M second call service channels are formed between the operator and a second terminal, and the method comprises:

establishing a call connection to the second terminal after at least two interactions between the first terminal and the second terminal are completed, wherein each interaction comprises the first terminal sending N requests to the operator that forwards M requests to the second terminal, and the second terminal feeding back M responses to the operator that sends N responses to the first terminal;

allocating first call data to the N first call service channels after the call connection is established; and sending the first call data to the second terminal by using the N first call service channels, wherein the first call data is transmitted to the operator by using the N first call service channels, the first call data is re-allocated by the operator into M groups and then is sent, and the second terminal receives, by using the M second call service channels, the first call data allocated into the M groups, wherein N and M are positive integers, and a value of at least one of N and M is greater than 1.

2. The call method according to claim 1, wherein in a case that N is greater than 1, the allocating first call data to the N first call service channels comprises:

obtaining first channel quality parameters that represent channel quality and that are respectively corresponding to the N first call service channels;

determining a first data proportion corresponding to each first call service channel according to the first channel quality parameters respectively corresponding to the N first call service channels, wherein the channel quality is positively correlated with the first data proportion; and allocating the first call data into N groups according to the first data proportion corresponding to each first call service channel, and allocating the allocated first call data to the N first call service channels.

3. The call method according to claim 2, wherein the obtaining first channel quality parameters that represent channel quality and that are respectively corresponding to the N first call service channels comprises:

performing channel quality detection on the N first call service channels according to a first preset period, and obtaining the first channel quality parameter corresponding to each first call service channel; and for each first preset period, re-determining, by the first terminal, the first data proportion corresponding to each first call service channel according to the obtained first channel quality parameters respectively corresponding to the N first call service channels.

4. The call method according to claim 1, wherein the operator comprises N first access network devices corresponding to the first terminal, and the method further comprises:

sending N first connection requests corresponding to the N first access network devices to the operator; and receiving N pieces of first response information sent by the operator, and establishing an N-channel connection to the operator, so that each first access network device forms the first call service channel with the first terminal.

5. The call method according to claim 1, wherein the method further comprises:

sending N call setup requests to the second terminal by using the N first call service channels; and after a first call setup response fed back by the second terminal is received, completing one interaction with the second terminal, and establishing the call connection to the second terminal after at least two interactions are completed, so that the call setup request is sent by the operator to the second terminal, the operator forwards M call setup requests to the second terminal after receiving a first call setup request, the second terminal feeds back M call setup responses to the operator by using the M second call service channels after receiving one call setup request among the forwarded M call setup requests, and the operator feeds back N call setup responses to the first terminal after receiving one call setup response among the M call setup responses fed back by the second terminal.

6. A call method, performed by a second terminal, wherein M second call service channels are formed between the second terminal and an operator, N first call service channels are formed between the operator and a first terminal, and the method comprises:

receiving, by using the M second call service channels, first call data sent by the first terminal, wherein after a call connection is established to the second terminal, the first call data is allocated by the first terminal to the N first call service channels and then is sent to the operator, and the first call data is re-allocated by the operator into M groups after being aggregated and then is sent, wherein N and M are positive integers, and a value of at least one of N and M is greater than 1, and wherein the call connection to the second terminal is established after at least two interactions between the first terminal and the second terminal are completed, wherein each interaction comprises the first terminal sending N requests to the operator that forwards M requests to the second terminal, and the second terminal feeding back M responses to the operator that sends N responses to the first terminal.

7. The call method according to claim 6, wherein before the receiving first call data sent by the first terminal, the method further comprises:

reporting, to the operator, second channel quality parameters that represent channel quality and that are respectively corresponding to the M second call service channels, so that after the second terminal reports the second channel quality parameters, the operator determines a second data proportion corresponding to each second call service channel according to the second channel quality parameters respectively corresponding to the M second call service channels, and allocates the first call data to the M second call service channels according to the second data proportion, wherein the channel quality is positively correlated with the second data proportion.

8. The call method according to claim 7, wherein the reporting, to the operator, second channel quality parameters that represent channel quality and that are respectively corresponding to the M second call service channels comprises:

performing channel quality detection on the M second call service channels according to a second preset period, and obtaining the second channel quality parameter corresponding to each second call service channel; and for each second preset period, reporting, to the operator, the second channel quality parameters respectively corresponding to the M second call service channels.

9. The call method according to claim 6, wherein the operator comprises M second access network devices corresponding to the second terminal, and the method further comprises:

sending M second connection requests corresponding to the M second access network devices to the operator; and receiving M pieces of second response information sent by the operator, and establishing an M-channel connection to the operator, so that each second access network device forms the second call service channel with the second terminal.

10. The call method according to claim 6, wherein the method further comprises:

receiving a call setup request sent by the first terminal; and in response to a received first call setup request, feeding back M call setup responses to the first terminal by using the M second call service channels, wherein N call setup requests are sent by the first terminal to the operator by using the N first call service channels, the operator forwards M call setup requests to the second terminal after receiving one call setup request among the N call setup requests sent by the first terminal, the operator feeds back N call setup responses to the first terminal after receiving a first call setup response, and after receiving one call setup response among the N call setup responses fed back by the operator, the first terminal completes one interaction with the second terminal, and establishes the call connection after at least two interactions between the second terminal and the first terminal are completed.

11. An electronic device, comprising a processor; a memory having a computer program or an instruction stored thereon, wherein the program or the instruction, when executed by the processor, causes the processor to implement a call method, wherein N first call service channels are formed between the first terminal and an operator, M second call service channels are formed between the operator and a second terminal, and the method comprises:

establishing a call connection to the second terminal after at least two interactions between the first terminal and the second terminal are completed, wherein each interaction comprises the first terminal sending N requests to the operator that forwards M requests to the second terminal, and the second terminal feeding back M responses to the operator that sends N responses to the first terminal;

allocating first call data to the N first call service channels after the call connection is established; and sending the first call data to the second terminal by using the N first call service channels, wherein the first call data is transmitted to the operator by using the N first call service channels, and the first call data is re-allocated by the operator into M groups and then is sent, and the second terminal receives, by using the M second call service channels, the first call data allocated into the M groups, wherein N and M are positive integers, and a value of at least one of N and M is greater than 1.

12. The electronic device according to claim 11, wherein in a case that N is greater than 1, the allocating first call data to the N first call service channels comprises:

obtaining first channel quality parameters that represent channel quality and that are respectively corresponding to the N first call service channels;

determining a first data proportion corresponding to each first call service channel according to the first channel quality parameters respectively corresponding to the N first call service channels, wherein the channel quality is positively correlated with the first data proportion; and allocating the first call data into N groups according to the first data proportion corresponding to each first call service channel, and allocating the allocated first call data to the N first call service channels.

13. The electronic device according to claim 12, wherein the obtaining first channel quality parameters that represent channel quality and that are respectively corresponding to the N first call service channels comprises:

performing channel quality detection on the N first call service channels according to a first preset period, and obtaining the first channel quality parameter corresponding to each first call service channel; and for each first preset period, re-determining, by the first terminal, the first data proportion corresponding to each first call service channel according to the obtained first channel quality parameters respectively corresponding to the N first call service channels.

14. The call method according to claim 11, wherein the operator comprises N first access network devices corresponding to the first terminal, and the method further comprises:

sending N first connection requests corresponding to the N first access network devices to the operator; and receiving N pieces of first response information sent by the operator, and establishing an N-channel connection to the operator, so that each first access network device forms the first call service channel with the first terminal.

15. The call method according to claim 11, wherein the method further comprises:

sending N call setup requests to the second terminal by using the N first call service channels; and after a first call setup response fed back by the second terminal is received, completing one interaction with the second terminal, and establishing the call connection to the second terminal after at least two interactions are completed, so that the call setup request is sent by the operator to the second terminal, the operator forwards M call setup requests to the second terminal after receiving a first call setup request, the second terminal feeds back M call setup responses to the operator by using the M second call service channels after receiving one call setup request among the forwarded M call setup requests, and the operator feeds back N call setup responses to the first terminal after receiving one call setup response among the M call setup responses fed back by the second terminal.

* * * * *